United States Patent [19]

van Opijnen

[11] 4,401,936
[45] Aug. 30, 1983

[54] PROTECTION SYSTEM FOR SERIES REGULATOR

[75] Inventor: L. J. K. van Opijnen, Needham, Mass.

[73] Assignee: Tympanium Corporation, Woburn, Mass.

[21] Appl. No.: 224,654

[22] Filed: Jan. 12, 1981

[51] Int. Cl.³ .................... H02J 7/10; H02P 9/00; H02H 3/28
[52] U.S. Cl. ...................... 320/59; 322/28; 322/94; 323/276; 361/18
[58] Field of Search ............ 320/57, 59, DIG. 2; 322/28, 89, 90, 94, 95; 323/276; 361/18

[56] References Cited

U.S. PATENT DOCUMENTS

| | | | |
|---|---|---|---|
| 3,079,543 | 2/1963 | Decker | 323/276 |
| 3,581,150 | 5/1971 | Kirk et al. | 322/28 X |
| 3,710,227 | 1/1973 | Hill | 320/59 |
| 3,857,082 | 12/1974 | van Opijnen | 320/59 X |
| 3,943,408 | 3/1976 | Jakobs et al. | 322/28 X |
| 4,008,418 | 2/1977 | Murphy | 323/276 X |
| 4,020,395 | 4/1977 | Erickson et al. | 361/18 X |
| 4,040,115 | 8/1977 | Gruson | 361/18 |

*Primary Examiner*—R. J. Hickey
*Attorney, Agent, or Firm*—Weingarten, Schurgin, Gagnebin & Hayes

[57] ABSTRACT

A protection system is described for series regulators exposed to power sources such as permanent magnet alternators which may exhibit high open circuit voltages. The subject system includes a circuit which protects the control transistor in the regulator from a forward bias second breakdown by clamping it OFF responsive to the alternator output voltage exceeding a predetermined level. In one embodiment the clamping circuit keeps this transistor off during enough of the duty cycle to reduce the voltage across the control transistor to a level above which second breakdown occurs. In one embodiment, an auxiliary circuit shorts the alternator output terminals to ground to protect electrical apparatus connected to the alternator from burn-out due to high voltages occasioned by sulfated batteries or loose battery terminals which result in a high impedance being presented to the alternator.

8 Claims, 4 Drawing Figures

PROTECTION SYSTEM FOR SERIES REGULATOR

FIELD OF INVENTION

This invention relates to voltage regulators and in particular to a protection system for series regulators which protects a main control transistor against second breakdown due to high voltages from the alternator or other power source.

BACKGROUND OF THE INVENTION

As is common, voltage regulators are employed in the charging of batteries utilized or recreational vehicles which regulators are necessary to prevent overcharging of the battery.

In recreational vehicles such as ski mobiles, motorcycles or outboard motorboats, alternators are employed with engines that have a very wide speed range. As a result the voltages from the alternator may range in the hundreds of volts. For instance, with respect to ski mobiles and motorcycles, the engines may occasionally be revved to 10,000 rpm which can result in a maximum voltage of approximately 500 volts. In wide speed range engines shunt regulators are sometimes used, in which the alternator output terminals are shorted when the battery voltage exceeds a predetermined threshold. Another approach is to open circuit the alternator when the battery voltage rises above a predetermined threshold. These type circuits utilize a drive or control transistor to render non-conductive the silicon controlled rectifiers (SCRs) used to disconnect the alternator from the battery when the battery voltage exceeds the predetermined threshold. When the silicon controlled rectifiers are rendered non-conductive, the result is extremely high open-circuit voltages being applied across the control or drive transistor. When the battery voltage drops to a point where charging is to begin, the control transistor is to be turned ON. However, if the control transistor is turned ON with a high voltage across it, forward bias second breakdown may occur and the transistor will be destroyed. In the second breakdown, the transistor first becomes conductive but is then unable to withstand the high energy surge through it.

In summary, selected drive transistors can withstand normal collector-to-emitter voltages on the order of 500 volts and can supply sufficient current to drive the silicon controlled rectifiers. However these same drive transistors are prone to second breakdown when, after the transistor is turned OFF, the transistor is to be turned ON and the collector-to-emitter voltage is high (e.g. more than 50 volts) due to a high alternator output which is the result of interrupting the connection between the alternator and the battery. This second breakdown problem may be solved by utilizing even higher power control transistors. However the cost of designing and providing such a high power switching transistor is prohibitive, i.e. unattractive, uneconomical or expensive.

By way of background, one type series shunt regulator is illustrated in U.S. Pat. No. 3,857,082 issued to L.J.K. van Opijnen Dec. 24, 1974 and is assigned to the Assignee of the subject application. In this patent a series regulator is shown in which a diode bridge utilizing SCRs is utilized to open the circuit between the alternator and the battery terminals when the battery is fully charged. A shorting circuit is also described which shorts the alternator output terminals together every time the bridge portion of the circuit opens up. This means that when the battery is full, the diode bridge is opened up and the terminals of the alternator are shorted together. While in many applications shorting of the alternator terminals does not damage the alternator, in marginally designed alternators damage through overheating can occur.

If in an effort to spare the marginally designed alternator, the alternator terminals are not shorted, the output of the alternator will rise above the forward bias second breakdown voltage for the control transistor.

SUMMARY OF THE INVENTION

In order to provide a low cost system which protects the alternator and protects the control or drive transistor of a series regulator from forward bias second breakdown, a system is devised for sensing the voltage differential between the battery voltage and the AC output voltage from the alternator. The control transistor is prevented from turning ON when this voltage exceeds a predetermined level. The predetermined level is set below the level which corresponds to the second breakdown voltage of the particular control transistor utilized. Thus in an alternative explanation, the voltage across the control transistor is sensed and the control transistor is clamped OFF when this voltage rises to within a given percent of the second breakdown voltage. In one embodiment this is done by clamping the base of the control transistor to its emitter. In a further embodiment, the control transistor is kept off only during enough of the duty cycle to protect it. This means it is kept off for enough of the duty cycle so that the total energy through the transistor will never exceed that at which second breakdown occurs.

In a still further embodiment an auxiliary circuit is employed to short the alternator output terminals to ground to protect electrical apparatus connected to the alternator from burn out due to over-voltages occasioned by sulfated batteries or loose battery terminals which result in a high impedance being presented to the alternator. This shorting circuit is set to operate usually in the 20–50 volt range which is different from the voltage range at which the diode bridge circuit is interrupted, e.g. 13–14 volts. This differs from the operation of the series shunt regulator described in the aforementioned patent in that the shorting of the alternator terminals in the subject invention does not take place every time the bridge portion of the circuit is opened up to control battery charging. Rather it is opened up at a considerably higher voltage level to protect against the sulfated battery and loose terminal situation.

DESCRIPTION OF THE DRAWINGS

These and other features of the present invention can be more fully understood from the detailed description of the preferred embodiment presented below for purposes of illustration, and not by way of limitation, and from the accompanying drawings of which.

DETAILED DESCRIPTION

Figure 1:
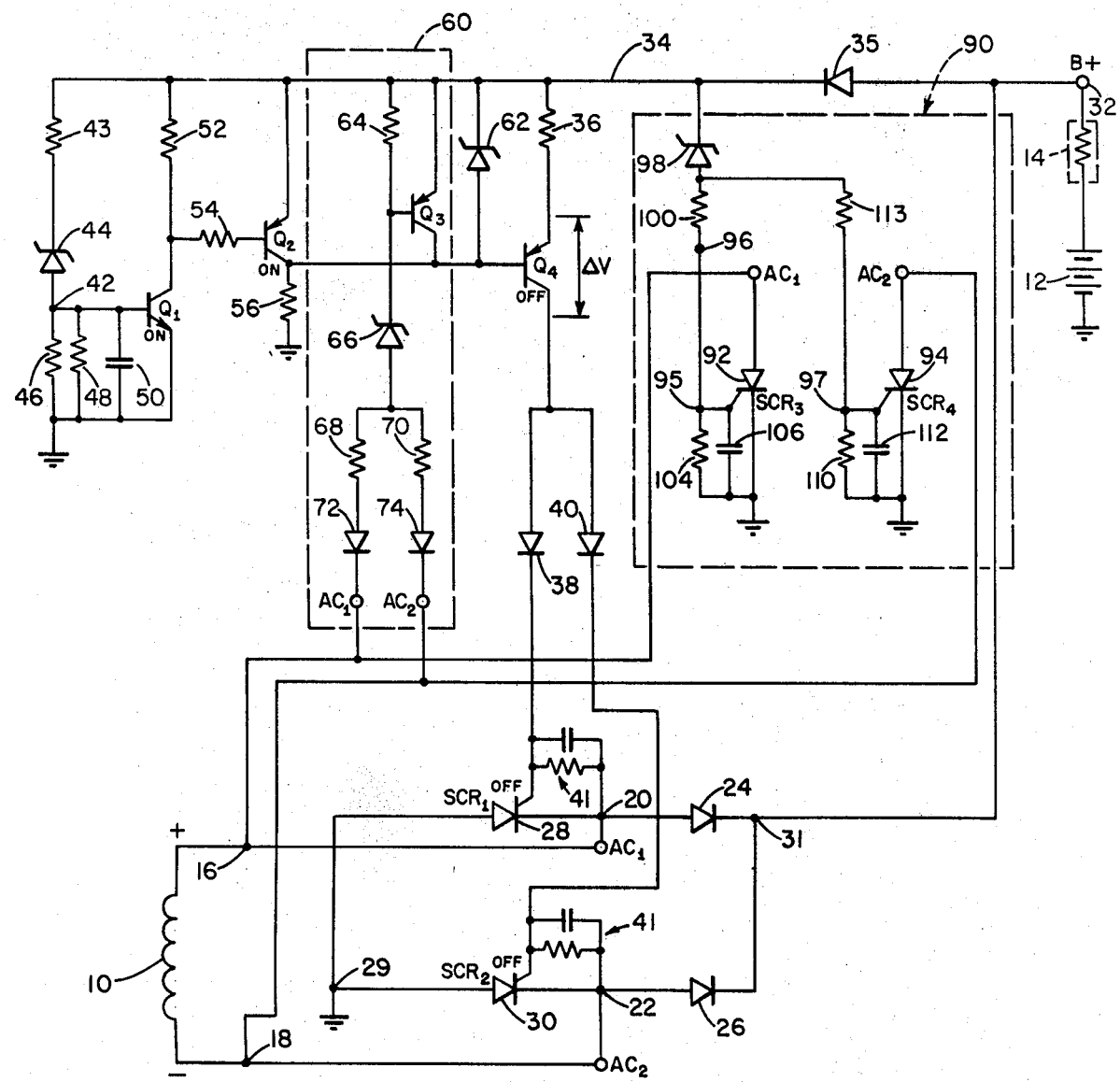
FIG. 1 is a circuit diagram of the subject regulator with protection and auxiliary circuits.

Referring now to FIG. 1, a regulator circuit is described in which the regulator circuit is inserted between an alternator winding 10 and a battery 12 having an internal resistance 14. Alternator winding 10 has two output terminals 16 and 18 coupled respectively to opposite points 20 and 22 of a diode rectifying bridge which includes diodes 24 and 26 and SCRs 28 and 30, here labelled respectively SCR1 and SCR2. The junction 29 of the anodes of SCR1 and SCR2 is grounded and the junction 31 of the cathodes of diodes 24 and 26 is applied to the B+ battery terminal 32 as illustrated.

The control circuit for SCR1 and SCR2 is illustrated as including transistors Q1, Q2 and Q4, with transistor Q4 being the aforementioned control transistor. Transistor Q4 is connected between a B+ voltage bus 34 which is connected to battery terminal 32 through diode 35, and the control terminals of SCR1 and SCR2. This connection includes a resistor 36 between bus 34 and the emitter of Q4 and diodes 38 and 40 between the collector of Q4 and the respective control terminals of SCR1 and SCR2. Also connected between the control terminals of the SCRs and the respective bridge connection points 20 and 22 is a dv/dt circuit comprising parallel-connected RC circuit 41.

The voltage on the base of transistor Q4 is controlled by transistors Q1 and Q2, in which transistor Q1 has its base connected to a point 42 on a voltage dividing circuit comprising resistor 43, Zener diode 44 and resistor 46 all connected between bus 34 and ground. In one embodiment resistor 43 has a value of 33K, Zener 44 has a reverse bias breakdown voltage of 8.2 volts and resistor 46 in a value of 3.3K, with capacitor 50 utilized for smoothing. The collector of Q1 is connected through a resistor 52 to bus 34 and its emitter is grounded as illustrated. The collector of Q1 is coupled to the base of Q2 through resistor 54, the emitter of which is connected directly to bus 34 and the collector of which is coupled directly to the base of Q4. The collector of Q2 is connected to ground via 56, which is also used to turn on Q4.

It will be appreciated that Q1 senses the battery voltage and when this voltage exceeds a predetermined level, such as 14 volts, Q1 is turned ON which turns ON Q2, thereby raising the voltage at the base of Q4 to B+ which turns Q4 OFF. It should be noted that resistors 52 and 54 may have values of 10K whereas a resistor 56 coupled between the base of Q4 and ground may also have a value of 10K. Zener diode 62 in combination with resistor 36 and transistor Q4 form a constant current drive to the gates of SCR1 and SCR2 via switching diodes 38 and 40.

In order to protect transistor Q4 from second breakdown which occurs when Q4 is turned ON and has to dissipate an excess amount of energy because of the high emitter-to-collector voltage (in one embodiment above 50 volts with a current of 50 ma), a circuit generally indicated by as lying within dotted box 60 includes a transistor Q3 coupled between bus 34 and the base of Q4. Transistor Q3 is biased normally OFF with its base connected to the mid-point between resistor 64 and Zener diode 66. The anode of Zener 66 is coupled respectively through resistors 68 and 70 and diodes 72 and 74 to terminals 16 and 18 of alternator winding 10 such that the alternator outputs AC1 and AC2 are delivered to the cathodes of diodes 72 and 74 as illustrated.

In operation, Q3 prevents the turn on of transistor Q4 whenever the A.C. voltage from the alternator exceeds the battery voltage by a predetermined differential determined by the values of Zener diode 66 and resistors 68 and 70. This predetermined differential corresponds to a ΔV being less than that voltage at which forward bias second breakdown could occur. In one embodiment the Zener diode 66 has a reverse bias breakdown voltage of 39 volts, whereas resistors 68 and 70 have values of 47K. The value of Zener 66 results in Q3 turning ON when the voltage between emitter and collector of Q4 exceeds a chosen voltage. The turning ON of transistor Q3 removes the drive for transistor Q4 thereby rendering it non-conductive.

Diodes 72 and 74 are interposed in the circuit so that the voltage seen at the base of Q3 is the most negative voltage appearing at terminals 16 or 18. With the sense of the current shown by the plus and minus signs at terminals 16 and 18 respectively, diode 72 blocks the alternator voltage while diode 74 allows the current to pass therethrough. This situation is, of course, reversed on the next half cycle.

Resistors 68 and 70 are utilized as current limiting resistors to limit the current through Zener diode 66.

The reverse bias breakdown voltage of Zener diode 66 sets the point at which the Q3 is turned on. Resistor 64 is utilized to make sure that Q3 is rendered nonconductive, even in the face of small leakage currents from Zener diode 66.

Figure 2:
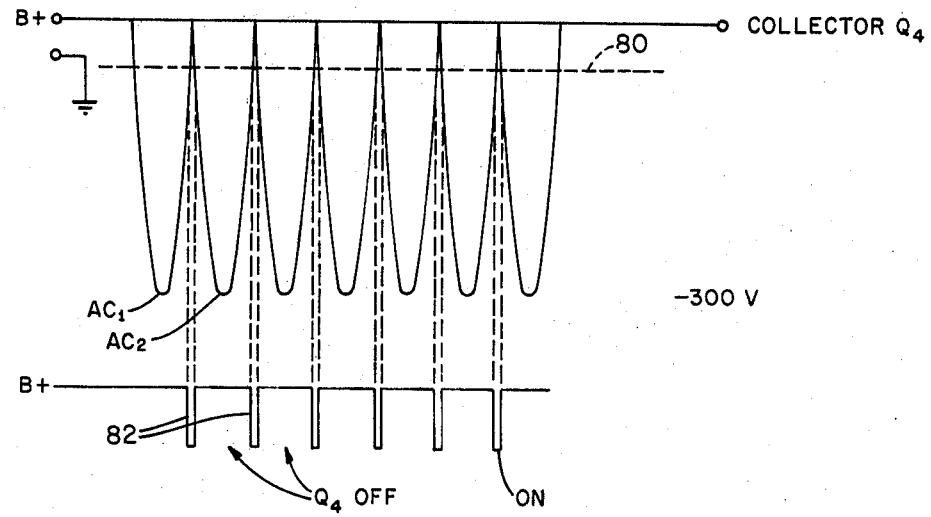
FIG. 2 is a waveform diagram illustrating the voltage on the collector of the control transistor of the circuit of FIG. 1.
Figure 3:
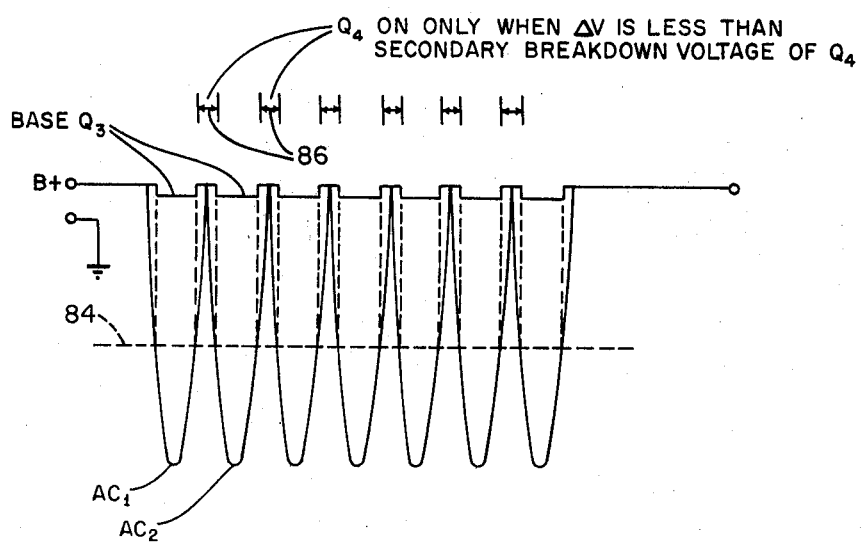
FIG. 3 is a waveform diagram illustrating the sensing of the voltage across the emitter-collector pair of the control transistor of FIG. 1, and the length of time which the control transistor is allowed to be ON or conductive; and, FIG. 4 is a circuit diagram of an alternative embodiment of the subject invention.

Prior to describing the aforementioned auxiliary circuit and referring now to FIGS. 2 and 3, it can be seen that the signals on the collector of transistor Q4 are the negative-going portions AC1 and AC2. The regulator in general renders Q4 non-conductive for that period of time when either AC1 or AC2 exceeds a certain absolute reference level 80. Waveforms 82 illustrate the times when Q4 can be turned ON by Q1 and Q2.

Referring now to FIG. 3, the base of Q3 is turned ON during those portions of AC1 and AC2 which are at a level chosen to be lower in absolute level than the forward bias second breakdown voltage of Q4, here illustrated by dotted line 84. The result is that Q4 is ON only for the length of time illustrated at 86, e.g. only when ΔV is less than the second breakdown voltage of Q4. This means that, all things being equal, Q4 is rendered conductive only for that portion of the duty cycle which results in the effective voltage across Q4 being less than its second breakdown voltage.

Note that once SCR1 and SCR2 are turned ON they stay ON for the remainder of the half cycle forcing full alternator current into the load. What happens during this half cycle with a sulfated battery or loose battery terminal is now described.

Referring now back to FIG. 1, auxiliary circuit 90 is utilized to ground out the terminals of the alternator when either battery terminal 32 is loose or battery 12 is sulfated which can be represented by an increased value of 14. The result of a loose battery terminal or a sulfated battery is such that high voltages from the alternator are not controlled by the battery such that apparatus connected to the output of the regulator may be damaged or burned out.

In order to eliminate such a possibility, auxiliary circuit 90 results in the shorting or shunting of terminals 16 and 18 to ground. For this purpose, SCRs 92 and 94, hereinafter referred to as SCR3 and SCR4, are connected between terminals 16 and 18 respectively and ground thereby grounding the terminals when either SCR3 or SCR4 is rendered conductive.

SCR3 and SCR4 are rendered conductive when a voltage at bus 34 rises, for instance, above say 30 volts. For SCR 3 this is determined by a voltage dividing network including a Zener diode 98, a resistor 100, a resistor 104, and the input resistance of SCR3. Additionally a capacitor 106 is employed for dv/dt smoothing. Note that point 95 is connected to the control terminal of SCR3.

For SCR4, the above voltage is determined by a voltage dividing network including Zener diode 98, resistor 113, a resistor 110 and the input resistance of SCR4, with point 97 between resistor 113 and resistor 110 being connected to the control terminal SCR4. A capacitor 112 is coupled between the control terminal of SCR4 and ground for smoothing purposes.

In operation, when the voltage at bus 34 exceeds for instance a predetermined voltage, say 30 volts, either SCR3 or SCR4 is turned ON thereby to short the terminals of the output winding of the alternator to ground. It will be appreciated that auxiliary circuit 90 only is operative when the voltage across the battery exceeds the regulator set voltage by a fixed amount, which voltage is due primarily to sulfated batteries or loose battery terminals.

In normal operation the SCR1/SCR2 diode bridge opens up responsive to the battery voltage exceeding, for instance, 14 volts. However with loose battery terminals or sulfated batteries, full alternator current may be forced into the load for the remainder of the half cycle. Provision of auxiliary circuit 90 therefore protects the apparatus connected to the alternator by shunting the alternator only in circumstances of a high impedance being presented to the terminals 32 of the regulator and does not shunt the alternator during the normal regulation of current to the battery.

In summary, when the battery or load voltage drops below the regulator set voltage, Q4 will turn on SCR1 or SCR2 at the appropriate time, after which the SCR remains conductive for the remainder of the half cycle. The rising voltage between bus 34 and ground will cause Q1 and Q2 to turn off Q4 and thereby protect it from second breakdown, but any other electrical or electronic devices connected between terminal and ground will experience an output voltage determined by the alternator current-voltage output characteristics. This latter overvoltage condition is alleviated by the circuit within dotted box 90.

Figure 4:
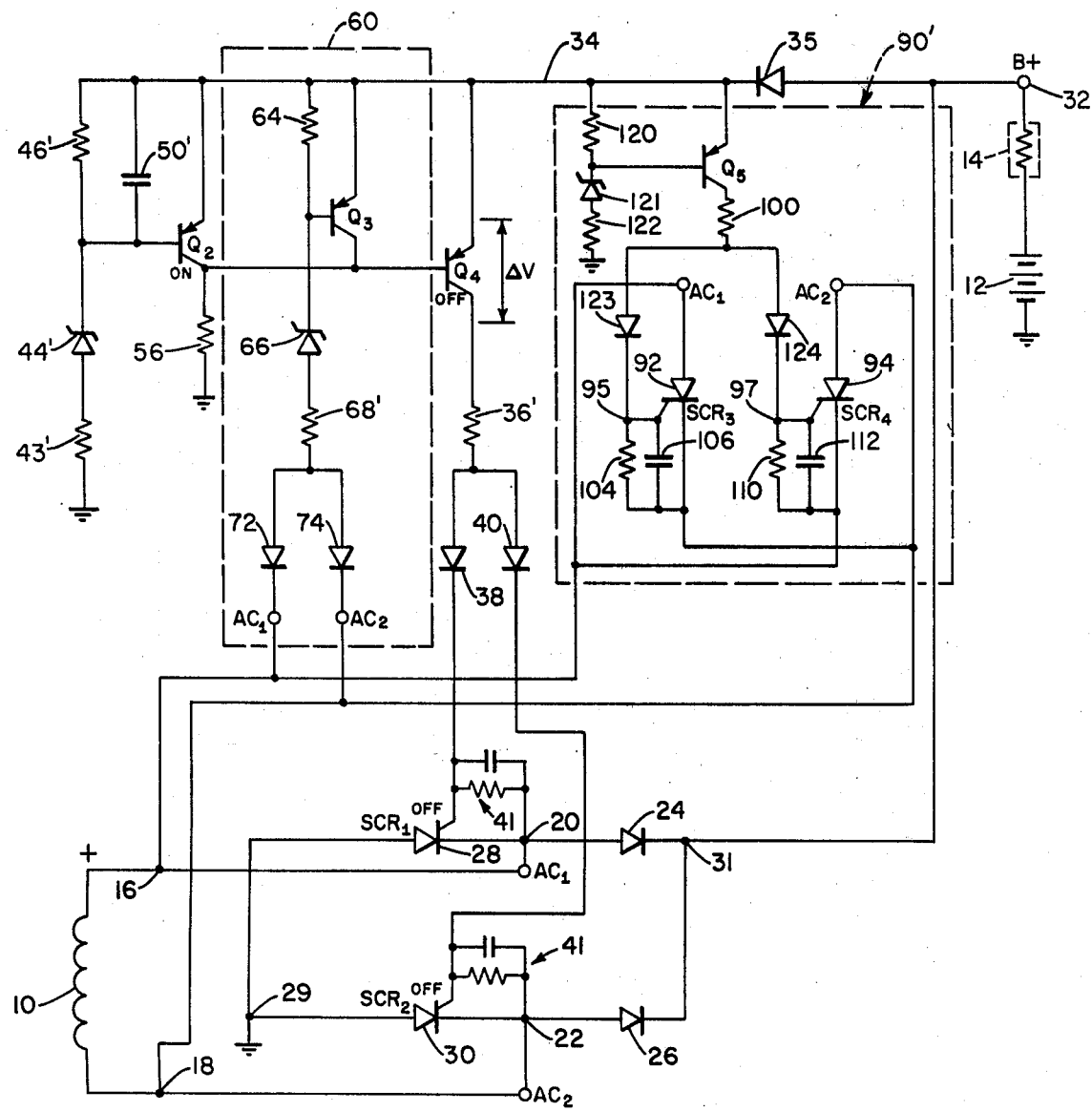

Referring now to FIG. 4, an alternative embodiment of the subject invention is illustrated in which like circuit elements carry like reference characters with respect to FIG. 1. It will be appreciated that Q1 has been eliminated and that the circuit within dotted box 90 has been changed (see dotted box 90) with a transistor Q5 coupled between bus 34 and diodes 123 and 124 respectively. A resistor 100 is connected between the collector of Q5 and interconnection point 109. The base of Q5 is tied to a point between a series of elements connected between bus 34 and ground, namely resistor 120, Zener diode 121 and resistor 122. Note further that resistor 36' is positioned between collector of Q4 and the anodes of diodes 38 and 40 with resistor 68' being positioned between the anode of Zener diode 66 and the anodes of diodes 72 and 74. Moreover, Zener diode 44' and resistor 43' are connected in series with resistor 46' to ground with the base of Q2 now coupled between resistor 46' and Zener diode 44'. Note further capacitor 50' coupled between bus 34 and the base of Q2.

In operation, resistor 56 turns transistor Q4 ON. The collector of Q4 is current limited to a safe and sufficient value by resistor 36' and drives via diode 40 the gate of SCR2 which is turned ON and completes the charging circuit. Alternator current is passed via diode 24 to battery 12, with return current flowing via SCR2 to terminal 18.

During the next ½ cycle, with terminal 16 negative and terminal 18 positive, SCR1 is turned ON via resistor 36' and diode 38. Once again current is passed to the battery.

With respect to transistor Q2, this transistor senses the battery voltage via voltage divider comprising diode 35, resistor 46', Zener diode 44', and resistor 43'. When the battery terminal voltage exceeds the level preset by this voltage divider, Q2 turns ON and diverts the current through resistor 56 thereby turning OFF transistor Q4 and turning OFF the charge current to the battery. The function of the circuit within dotted box 60 is the same as illustrated in FIG. 1.

With respect to the circuit within dotted box 90', to prevent dangerously high output voltages across the battery or load which could damage the load or the regulator, a slightly different circuit 90 is illustrated. Here SCR3 and SCR4 connected directly across output terminals 16 and 18 of the alternator. They are, as illustrated, driven by the collector current of transistor Q5. Transistor Q5 senses battery terminal voltage via the voltage divider incorporating diode 35, resistor 120, Zener diode 121 and resistor 122. When this voltage exceeds a second predetermined level, for instance 20–30 volts, transistor Q5 is rendered conductive. At this time SCR3 turns ON which diverts alternator current away from the load so as to prevent damaging output voltages. When the polarity of the output from coil 10 is reversed, SCR4 shunts the alternator current.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A regulator circuit adapted to be connected between the output terminals of a power source which provides an A.C. signal at its output terminals to the terminals of a battery comprising:
   rectifying means interposed between the terminals of said power source and said battery, said rectifying means having switching elements adapted when opened to interrupt the circuit between the terminals of the power source and battery;
   means including a control transistor for opening said switching elements responsive to a predetermined battery charge; and
   means connected to the terminals of said power source and responsive to the output voltage of said power source relative to the battery voltage for clamping said control transistor off during enough of the AC duty cycle to reduce the energy through said control transistor to a level below which forward bias second breakdown occurs, said rectifying means including a diode bridge circuit having a first pair of opposite points connected across the terminals of said power source and a second pair of opposite points coupled across the terminals of said battery, said switching elements including silicon controlled rectifiers having control terminals coupled to a first electrode of said control transistor and to different ones of said first pair of points, a second electrode of said control transistor being connected to a first one of said battery terminals, said clamping means including means for clamping the control electrode of said control transistor to said first one of said battery terminals.

2. The circuit of claim 1 wherein said clamping means includes means for detecting a predetermined voltage differential between said power source terminals and the voltage at said first battery terminal and for actuating said clamping means when said predetermined differential has been exceeded.

3. The circuit of claim 2 wherein said detecting means includes a voltage dividing circuit and a rectifying circuit connected between said power source terminals and said first battery terminal.

4. The circuit of claim 3 wherein said voltage dividing circuit includes a Zener diode.

5. The circuit of claim 3 wherein said control electrode is coupled to a predetermined point in said voltage dividing circuit.

6. The circuit of claim 2 and further including means for shorting said power source terminals responsive to a high impedance being presented to the output of said rectifying means.

7. The circuit of claim 6 wherein said shorting means includes means for detecting when the voltage at said first battery terminals exceeds a predetermined level.

8. The circuit of claim 7 wherein said predetermined level is different from said predetermined battery charge.

* * * * *